March 16, 1954

J. PERRIN 2,672,288

SENSING OF PERFORATED STATISTICAL RECORDS

Filed May 9, 1951

3 Sheets-Sheet 1

Inventor
John Perrin

By [signature]

Attorney

March 16, 1954 J. PERRIN 2,672,288

SENSING OF PERFORATED STATISTICAL RECORDS

Filed May 9, 1951 3 Sheets-Sheet 2

Inventor
John Perrin
By
Attorney

SENSING OF PERFORATED STATISTICAL RECORDS

Filed May 9, 1951

3 Sheets-Sheet 3

Inventor
John Perrin
By
Attorney

Patented Mar. 16, 1954

2,672,288

UNITED STATES PATENT OFFICE 2,672,288

SENSING OF PERFORATED STATISTICAL RECORDS

John Perrin, Croydon, England, assignor to Powers-Samas Accounting Machine Limited, London, England, a British company Application May 9, 1951, Serial No. 225,310

Claims priority, application Great Britain May 17, 1950

6 Claims. (Cl. 235—61.11)

This invention relates to a machine for sorting perforated record cards in which data is recorded by perforations disposed in rows considered along one dimension of a card and in columns considered along the other dimension of the card, the data indicating positions of each row having like significance, said machine comprising a plurality of card receiving compartments corresponding in number to the number of data-indicating positions in a single column of a card, a card guide for each said compartment set normally to prevent a card from entering the compartment and movable to deflect a card into the compartment, and a timing device for each compartment operable as the result of an impulse received thereby following a sensing operation performed on a card to effect movement of the card guide for the compartment to deflect the sensed card into the compartment. A machine of this kind is referred to in the claims appended hereto as a machine of the class described.

It is a main object of the present invention to provide a new form of apparatus for sensing statistical record cards and effecting operation of said timing devices as a result of sensing operations performed on the cards.

As is well understood in the art, record cards are usually so made that the data-indicating positions are arranged with respect to the card in horizontal rows and vertical columns and the record card usually comprises twelve horizontal rows whereas the number of vertical columns may vary according to the capacity of the card. For example, a card may contain twenty-one, thirty-six, forty-five, or sixty-five vertical columns.

In carrying the invention into effect, a card disposed in a sensing position is illuminated so that light passes through a data-indicating perforation in the record to activate a photo-electric cell associated therewith. Due to the close disposition of adjacent data-indicating positions, as will be understood in the art, it is not practicable so to dispose the photo-electric cells that light can pass through a record perforation directly in a straight line to the cell associated with that data-indicating position. In order that light passing through a record perforation may pass to the appropriate photo-electric cell without substantial loss it is, in accordance with the invention, guided or deflected through a curved path to the photo-electric cell by a guide element hereinafter referred to as a "plastic refractive element." This element is made from transparent poly methyl methacrylate, preferably of the kind known as "Perspex," and has a highly polished outer surface from which sharp edges are removed to avoid any substantial loss of light passing along the element.

In order that the invention may be clearly understood an embodiment thereof will now be described by way of example with reference to the accompanying diagrammatic drawings in which.

Figure 1:
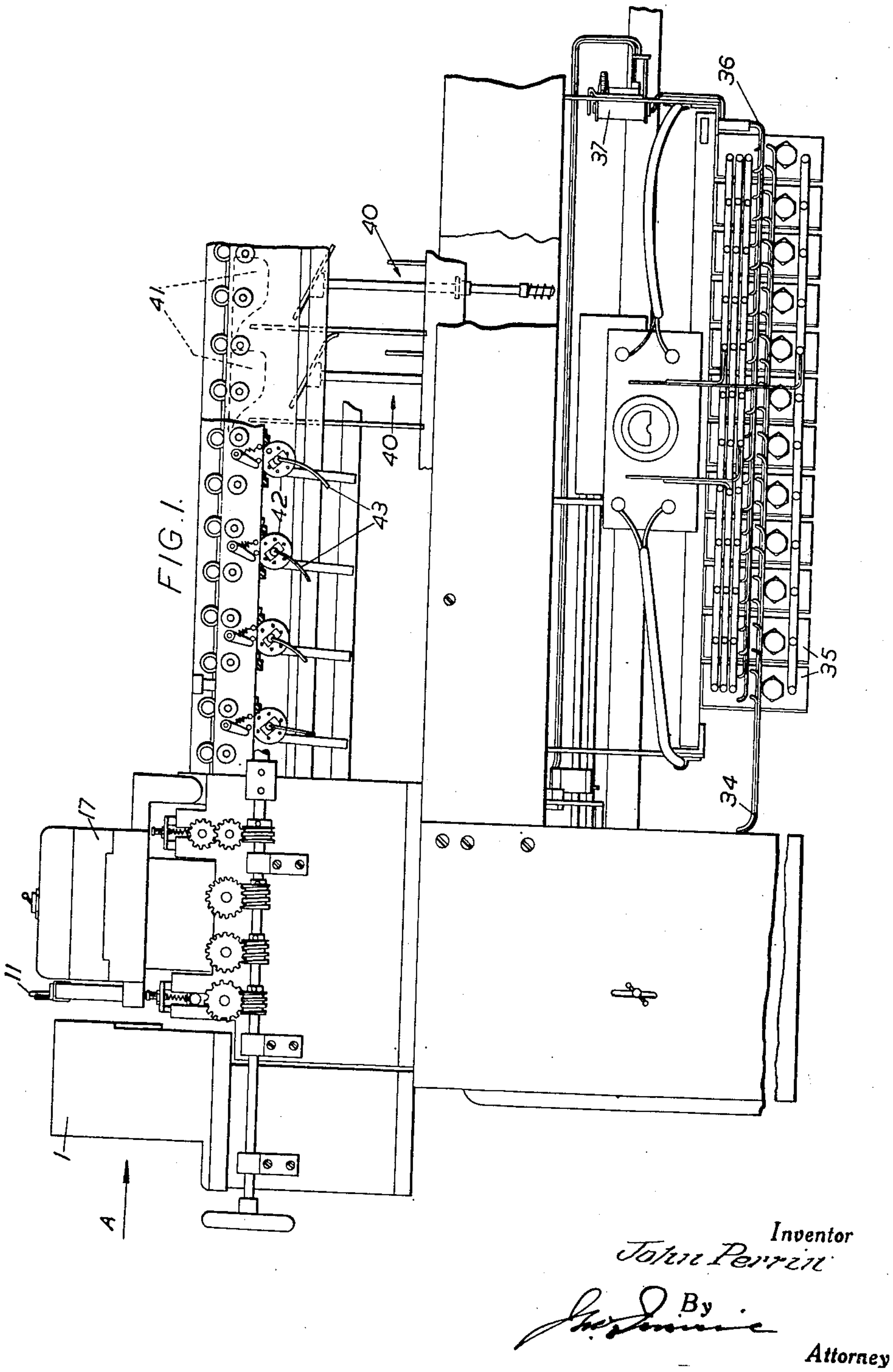
Fig. 1 is a side elevation of a part of a machine for sorting perforated statistical record cards.

Referring to the drawings, perforated record cards to be sorted are placed as a pile into a magazine 1 from the bottom of which they are fed one at a time by a reciprocating picker 2 of known construction driven from the main drive of the machine by mechanism not shown. The picker delivers a card to feed rollers 3, 4 which move the card into a sensing chamber formed by a top perforated plate 5, Figs. 3 and 4, and a bottom perforated plate 6 and also into engagement with a movable stop S operated, in well known manner, by mechanism not shown, which locates the card in the sensing chamber.

The top and bottom plates forming the sensing chamber comprise aligned apertures 7, 8, one for each data-indicating position on the card, and resting on the upper surfaces of the top plate is a series of apertured shutters 9, one for each vertical column, the shutters each being selectively and independently movable to expose or to obturate the apertures 7, 8 in the column appertaining thereto. To this end, each of the shutters is provided with a tail 10 slotted to receive the lower end of a manually operable lever 11 by which it can be moved into one or other of these two positions. The levers 11 are freely mounted on a stationary rod 12 and are retained in their set positions by a detent spring 13 which is engaged above or below a projection 14 on a lever.

Figure 2:
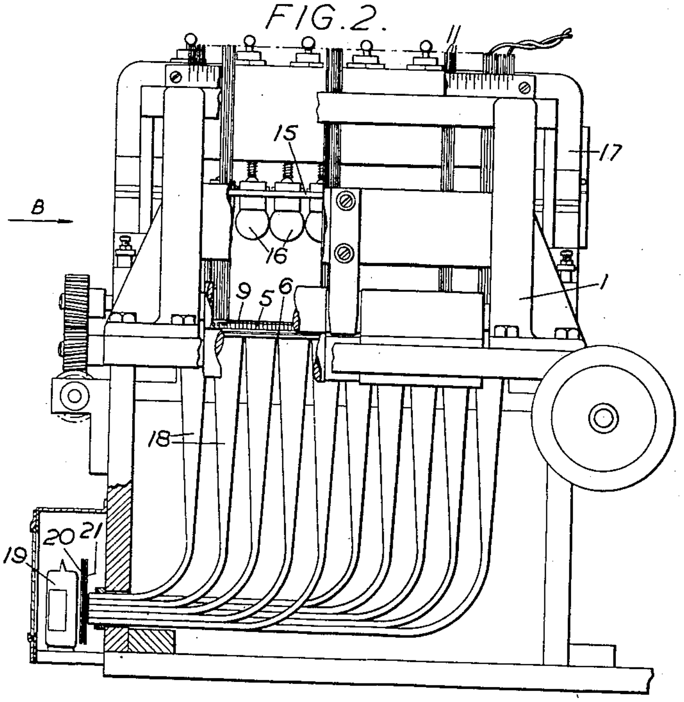
Fig. 2 is an end view of the sensing head of the machine looking in direction of arrow A, Fig. 1, and being partly broken away.

Above the sensing chambers is supported a plate 15 in which are mounted a plurality of electric lamps 16 to direct light downwards towards the sensing chamber and the plate is pivotally mounted on supporting frames 17, Fig. 2, so that, together with the lamps it can be swung clear of the sensing chamber to give access to the chamber.

In those columns where the shutters are positioned so as not to obturate the apertures in the top plate it will be understood that when no card is in the sensing chamber, light from the electric lamps 16 will pass through each of the unobturated apertures 7 in the top plate 5 and through the apertures 8 aligned therewith in the lower plate 6. When, however, a perforated record card is in position in the sensing chamber, the card will act to obturate all the apertures 8 in the lower plate 6 except in those positions where corresponding perforations are provided in the card. Thus only in these last mentioned positions will light pass through the upper and lower plates when a card is located in position for sensing in the sensing chamber.

Below the sensing chamber, there are provided plastic refractive elements 18 by which light passing through the top and bottom plates 5, 6 of the sensing chamber is guided or deflected to associated photo-electric cells 19, one for each data-indicating position in a vertical column of a record. Thus for sensing records having twelve data-indicating positions per column, twelve cells 19 are provided. It will be understood that the elements 18 in like positions in the different columns have their outer ends located adjacent the same cell 19. In the drawings the plates 5, 6 are assumed to be capable of sensing an eighty column record card and, as shown in Fig. 2, each horizontal row of apertures in the plates 5, 6 has ten elements 18 associated therewith, each element 18 accommodating eight adjacent plate apertures, and the ten elements 18 for the row are all associated with a single photoelectric cell 19.

Between the plastic refractive elements 18 and the photo-electric cells 19, there is provided a shutter device mounted for reciprocation in timed relation with the movement of the card stop which locates the card in sensing position in the sensing chamber. The shutter device consists of two plate-like elements 20, 21 supported for lengthwise reciprocation, the elements 20, 21 having apertures 22, 23 formed therein. The elements 20, 21 move in opposite directions in the manner of an iris and the element 21 is operated by an arm 24, Fig. 3, and cam 25 on a cross-shaft 26 driven in timed relation with the rollers 3, 4, picker 2 and the card stop S. The element 21 has an abutment 27 which is engaged in a slot 33 in one end of a lever 29 pivoted at 30 to the frame 31 of the machine. A second abutment 32 on the element 20 is engaged in a second slot 28 in the lever 29 so that as element 20 is moved in one direction element 21 is moved in the opposite direction and the apertures 22, 23 are so paired that the cells 19 associated therewith are exposed or obturated progressively from the centres of the cells. The operation of the shutter is such that when a card is located in the sensing position, the shutter 20, 21 is moved to expose the ends of each of the plastic refractive elements 18 to their associated photo-electric cells 19 so that light which passes along the refractive elements is received by the appropriate photo-electric cells. When a card is not in sensing position the shutter acts to obturate the photo-electric cells.

As stated above, the refractive elements are made of transparent poly methyl methacrylate, preferably of the kind known as "Perspex," and each refractive element is preferably of substantially square cross-section at the ends thereof which are adjacent cells 19 and at their other ends, see Fig. 2, are tapered to accommodate eight plate apertures as described above.

The photo-electric cells 19 cannot be disposed in a space as small as that occupied by the apertures 7, 8 of a column in the plates 5, 6 and the cells are supported on the side of the machine frame 31 at a position remote from the sensing chamber. In order that light passing through the apertures 7, 8 in the plates 5, 6 may be passed to the photo-electric cells the ends of each refractive element are out of alignment one with the other and the portion of the refractive element between its ends is suitably curved, see Fig. 2, so as to avoid loss of light as much as possible and further to reduce such loss the outer surfaces of the refractive element are highly polished all over and all sharp edges are removed. Further, the refractive elements are disposed to be free from physical contact with any other substance. For example, if the refractive elements were to be painted or immersed in oil or water, some loss of light passing along the elements would occur due to physical adhesion of the paint, oil or water with the refractive element. If, however, the refractive elements are engaged by dry substances they will function in the manner desired because there is no true physical contact between dry material and the refractive elements.

The photo-electric cells are connected by leads 34 to amplifiers 35 and thence by pairs of leads 36 with electromagnetic relays 37, Fig. 1.

Figure 3:
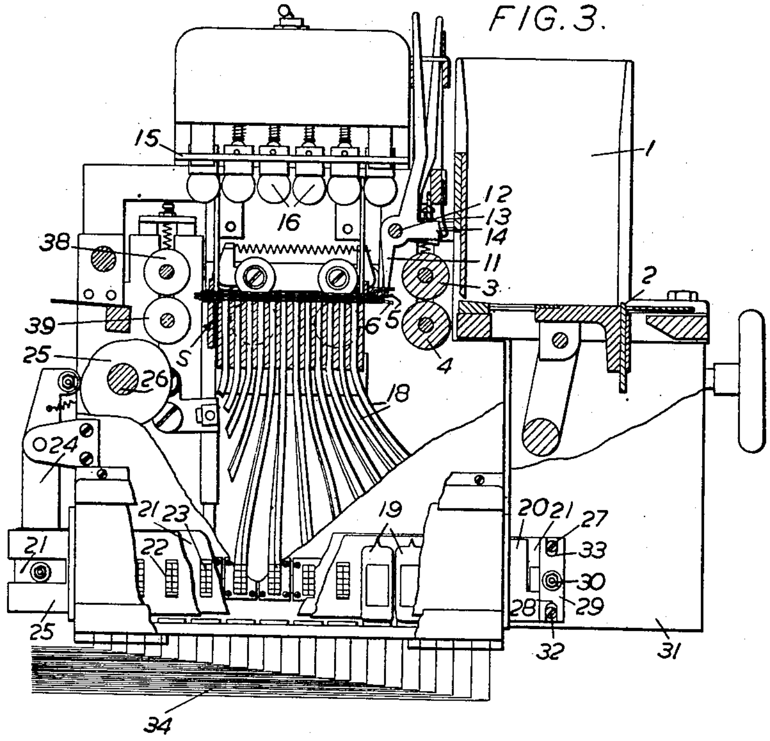
Fig. 3 is a side elevation, partly in section, looking in direction of arrow B, Fig. 2.
Figure 4:
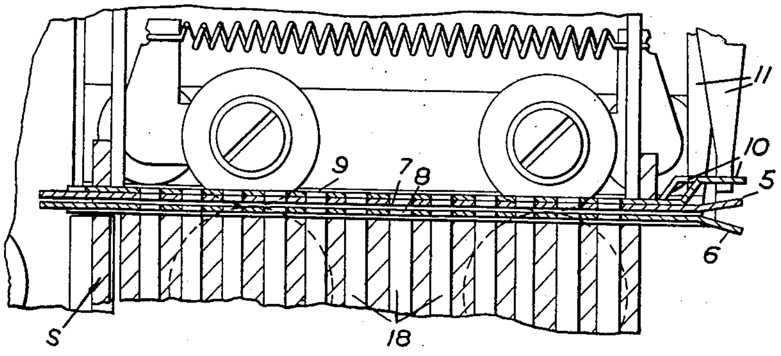
Fig. 4 shows a detail of Fig. 3 to an enlarged scale.

When the card is released from the sensing chamber it is conveyed by feeding rollers 38, 39, Fig. 3, towards a plurality of receiver pockets 40, Fig. 1, corresponding in number to the number of data-indicating positions in a single column of a card, each of which is provided with a normally inactive deflector 41 as described in United States patent specification No. 2,034,010. The deflectors may be operated by timing mechanism 42 similar to that described in specification No. 2,034,010 but in which the Bowden wire for actuating the mechanism is replaced by an electromagnet the armature of which is arranged, on actuation of the relay 37 associated therewith, to effect actuation of the mechanism to move the deflector 41 to active position and thereafter to restore it to inactive position.

Alternatively, the relays 37 may, in known manner, be arranged to operate Bowden wires 43 to effect actuation of the timing mechanism 42 and, if desired, the timing mechanism may be similar to that described in United States patent specification No. 1,502,993.

I claim:

1. In a machine of the class described, apparatus comprising a plurality of card-receiving compartments corresponding in number to the number of data-indicating positions in a single column of a card, a photo-electric cell for each card receiving compartment, a timing device for each card-receiving compartment, said timing device being actuated by impulses initiated from the cell appropriated to the compartment to control the delivery of a card to the compartment, a card chamber in which cards are always located in the same position for sensing, card locating means to locate a record card in said chamber, means to feed a card to said chamber, means to feed a card from said chamber to the receiving compartment to which it is to be delivered, means to illuminate a card in said chamber, a plurality of light conducting elements each to guide light to one only of said cells and being common to a plurality of data-indicating positions of a single row on a record card, manually operable shutters one for each column of a card and selectively operable to permit light from said illuminating means to pass through perforations formed in one column only of a card in said chamber, and an amplifier to amplify electric impulses transmitted from said cells to actuate the timing devices appropriated thereto.

2. Apparatus according to claim 1, wherein the cells are arranged in a single line and including a cell shutter device operable in timed relation with said means to feed a card to said chamber simultaneously to obturate said cells except when a card is located in the chamber for sensing.

3. Apparatus according to claim 2, wherein the cell shutter device comprises a pair of apertured elements supported one behind the other with the apertures therein paired for co-operation with cells appropriated thereto, and means for moving said elements lengthwise simultaneously in opposite directions progressively to expose or obturate the cells from the centres thereof.

4. Apparatus according to claim 3, wherein the means for moving said elements includes a positively rotated cam and a lever co-operating with one end of one element, a first lateral abutment extending from the other end of said element, a second lateral abutment extending from the like end of the other element of the pair, and a pivoted slotted lever engaging both said abutments.

5. Apparatus according to claim 4 wherein said chamber comprises a pair of apertured plates spaced apart to receive a record card therebetween, the apertures in the plates being aligned and in number and disposition corresponding to the data-indicating positions on a record card, said shutters being slidable on one of said plates and each apertured to correspond with a column of apertures in the plate, each said shutter co-operating with a manually operable lever appropriated thereto to effect sliding movement thereof relative to said plate.

6. Apparatus according to claim 1 wherein said chamber comprises a pair of apertured plates spaced apart to receive a record card therebetween, the apertures in the plates being aligned and in number and disposition corresponding to the data-indicating positions on a record card, said shutters being slidable on one of said plates and each apertured to correspond with a column of apertures in the plate, each said shutter co-operating with a manually operable lever appropriated thereto to effect sliding movement thereof relative to said plate.

JOHN PERRIN.

References Cited in the file of this patent

UNITED STATES PATENTS

| Number | Name | Date |
|---|---|---|
| 2,220,474 | Bryce | Nov. 5, 1940 |
| 2,319,108 | Broido | May 11, 1943 |
| 2,410,265 | Broido | Oct. 29, 1946 |